United States Patent
Allen

(10) Patent No.: US 7,008,586 B2
(45) Date of Patent: *Mar. 7, 2006

(54) METHOD OF EXTRUDING MULTI-COMPONENT LIQUID FILAMENTS

(75) Inventor: Martin A. Allen, Dawsonville, GA (US)

(73) Assignee: Nordson Corporation, Westlake, OH (US)

( * ) Notice: Subject to any disclaimer, the term of this patent is extended or adjusted under 35 U.S.C. 154(b) by 358 days.

This patent is subject to a terminal disclaimer.

(21) Appl. No.: 10/272,959

(22) Filed: Oct. 17, 2002

(65) Prior Publication Data

US 2003/0038395 A1    Feb. 27, 2003

Related U.S. Application Data

(62) Division of application No. 09/702,385, filed on Oct. 31, 2000, now Pat. No. 6,478,563.

(51) Int. Cl.
*D01D 5/30* (2006.01)
*D01D 5/32* (2006.01)
*D01D 5/34* (2006.01)
*D01D 5/36* (2006.01)

(52) U.S. Cl. ............................. 264/172.11; 264/172.13; 264/172.14; 264/172.15

(58) Field of Classification Search ........... 264/172.11, 264/172.13, 172.14, 172.15
See application file for complete search history.

(56) References Cited

U.S. PATENT DOCUMENTS

| | | | |
|---|---|---|---|
| 3,981,650 A | 9/1976 | Page | 425/72.2 |
| 4,406,850 A | 9/1983 | Hills | 264/171 |
| 4,818,463 A | 4/1989 | Buehning | 425/72.2 |
| 5,145,689 A | 9/1992 | Allen et al. | 425/72.2 |
| 5,162,074 A | 11/1992 | Hills | 156/644 |
| 5,344,297 A | 9/1994 | Hills | 425/131.5 |
| 5,466,410 A | 11/1995 | Hills | 264/172.11 |
| 5,511,960 A | 4/1996 | Terakawa et al. | 425/131.5 |
| 5,551,588 A | 9/1996 | Hills | 216/56 |
| 5,562,930 A | 10/1996 | Hills | 425/198 |
| 5,601,851 A | 2/1997 | Terakawa | 425/72.2 |
| 6,120,276 A | 9/2000 | Balk | 425/72.2 |

OTHER PUBLICATIONS

International Fiber Journal, *Special Report on Biocomponent Fibers Acquisitions Shake Up Fiber Industry Show Reports: Fiber Producer Exhibition, IDEA 98*, Jun. 1998.

Primary Examiner—Leo B. Tentoni
(74) Attorney, Agent, or Firm—Wood, Herron & Evans, L.L.P.

(57) ABSTRACT

An apparatus for extruding multiple types of liquid materials into multi-component filaments. A pair of outer manifold elements sandwich an intermediate manifold element. Respective channels are formed between opposing sides of the outer manifold elements and the respective opposite sides of the intermediate manifold element. These recesses form channels which diverge or widen away from associated inlets at the top of the manifold assembly. A die tip is coupled to the manifold assembly at a lower side and communicates with the outlets of the channels. The die tip includes a combining member for producing a desired multi-component filament configuration.

6 Claims, 3 Drawing Sheets ations of application Ser. No.
METHOD OF EXTRUDING MULTI-COMPONENT LIQUID FILAMENTS This application is a divisional of application Ser. No. 09/702,385, filed Oct. 31, 2000, now U.S. Pat. No. 6,478, 563. This application relates to U.S. application Ser. No. 09/702,387, filed Oct. 31, 2000, now U.S. Pat. No. 6,491, 507, and assigned to the assignee of the present invention. The disclosures of these related applications are fully incorporated herein by reference.

FIELD OF THE INVENTION

The present invention generally relates to apparatus for extruding thermoplastic filaments and, more particularly, apparatus for spunbonding multi-component filaments.

BACKGROUND OF THE INVENTION

Spunbonding or other techniques for extruding fine diameter filaments find many different applications in various industries including, for example, in nonwoven material manufacturing. This technology generally involves extruding a thermoplastic material from multiple rows of discharge outlets extending along the lower surface of an elongate spinneret. Spunbonded materials are used in such products as diapers, surgical gowns, carpet backings, filters and many other consumer and industrial products. The machines for spunbonding such materials can be very large with the filament discharge outlets numbering in the thousands.

For certain applications, it is desirable to utilize multiple types of thermoplastic liquid materials to form individual cross-sectional portions of each filament. Often, these multi-component filaments comprise two components and, therefore, are referred to as bicomponent filaments. For example, when manufacturing nonwoven materials for use in the garment industry, it may be desirable to produce bicomponent filaments having a sheath-core construction. The sheath may be formed from a softer material which is comfortable to the skin of an individual and the core may be formed from a stronger, but perhaps less comfortable material having greater tensile strength to provide durability to the garment. Another important consideration involves cost of the material. For example, a core of inexpensive material may be combined with a sheath of more expensive material. For example, the core may be formed from polypropylene or nylon and the sheath may be formed from a polyester or co-polyester. Many other multi-component fiber configurations exist, including side-by-side, tipped, and microdenier configurations, each having its own special applications. Various material properties can be controlled using one or more of the component liquids. These include, as examples, thermal, chemical, electrical, optical, fragrance, and antimicrobial properties. Likewise, many types of die tips exist for combining the multiple liquid components just prior to discharge or extrusion to produce filaments of the desired cross-sectional configuration.

One problem associated with multi-component extrusion apparatus involves the cost and complexity of the manifolds used to transmit each of the separate component liquids to the multi-component die tip. Typical manifolds must be machined with many different passages leading to the die tip to ensure that the proper flow of each component liquid reaches the die tip under the proper pressure and temperature conditions. These manifolds are therefore relatively complex and expensive components of the multi-component extrusion apparatus.

For these reasons, it would be desirable to provide multi-component extrusion apparatus having a manifold system which may be easily manufactured and yet fulfils the requirement of effectively transmitting each of the component liquids to the multi-component die tip.

SUMMARY OF THE INVENTION

The present invention therefore provides an apparatus for extruding multiple types of liquid materials into multi-component filaments including a unique manifold structure coupled with a multi-component die tip. Generally, the invention pertains to melt spinning apparatus, such as spunbonding and meltblowing apparatus. The preferred or illustrative embodiment specifically disclosed herein relates to a spunbonding apparatus. In one general aspect, the apparatus comprises an intermediate manifold element having first and second opposite surfaces. First and second outer manifold elements respectively couple to the first and second opposite surfaces and have respective opposed surfaces. Each opposed surface respectively abuts one of the first and second opposite surfaces of the intermediate manifold element. A first channel is formed between the opposed surface of the first outer manifold element and the first opposite surface of the intermediate manifold element. A second channel is formed between the opposed surface of the second outer manifold element and the second opposite surface of the intermediate manifold element. The first and second-channels have inlets for respectively receiving the first and second liquids and outlets for respectively discharging the first and second liquids. These inlets and outlets may be formed in the intermediate manifold element, in the outer manifold elements, or between the intermediate manifold element and the respective outer manifold elements. The first and second channels may comprise recesses formed in the first and second opposite surfaces of the intermediate manifold element, or recesses formed in the opposed surfaces of the first and second outer manifold elements, or any combination thereof which forms the necessary channels.

A die tip is coupled adjacent the manifold elements. The die tip includes a plurality of multi-component filaments discharge outlets and at least first and second liquid distribution passages. The first and second liquid distribution passages are adapted to receive the first and second liquids respectively from the outlets of the first and second channels. A liquid combining member communicates between the first and second liquid distribution passages and the filament discharge outlets. The liquid combining member is configured to receive the first and second liquids and combine the first and second liquids into respective multi-component filaments.

In a more specific preferred embodiment of the manifold structure, the first and second outer manifold elements have respective recesses and, more preferably, a plurality of recesses on their respective opposed surface. The intermediate manifold element is coupled between the respective opposed surfaces of the first and second outer manifold elements. The recesses on the respective first and second opposite surfaces of the intermediate manifold element communicate, and preferably align with corresponding recesses on the opposed surfaces of the first and second outer manifold elements. The communicating recesses together form at least first and second channels and, preferably, first and second pluralities of channels each having a liquid inlet and a liquid outlet communicating with the die tip on the opposite sides of the intermediate manifold element.

Various advantages, objectives, and features of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENTS

Figure 1:
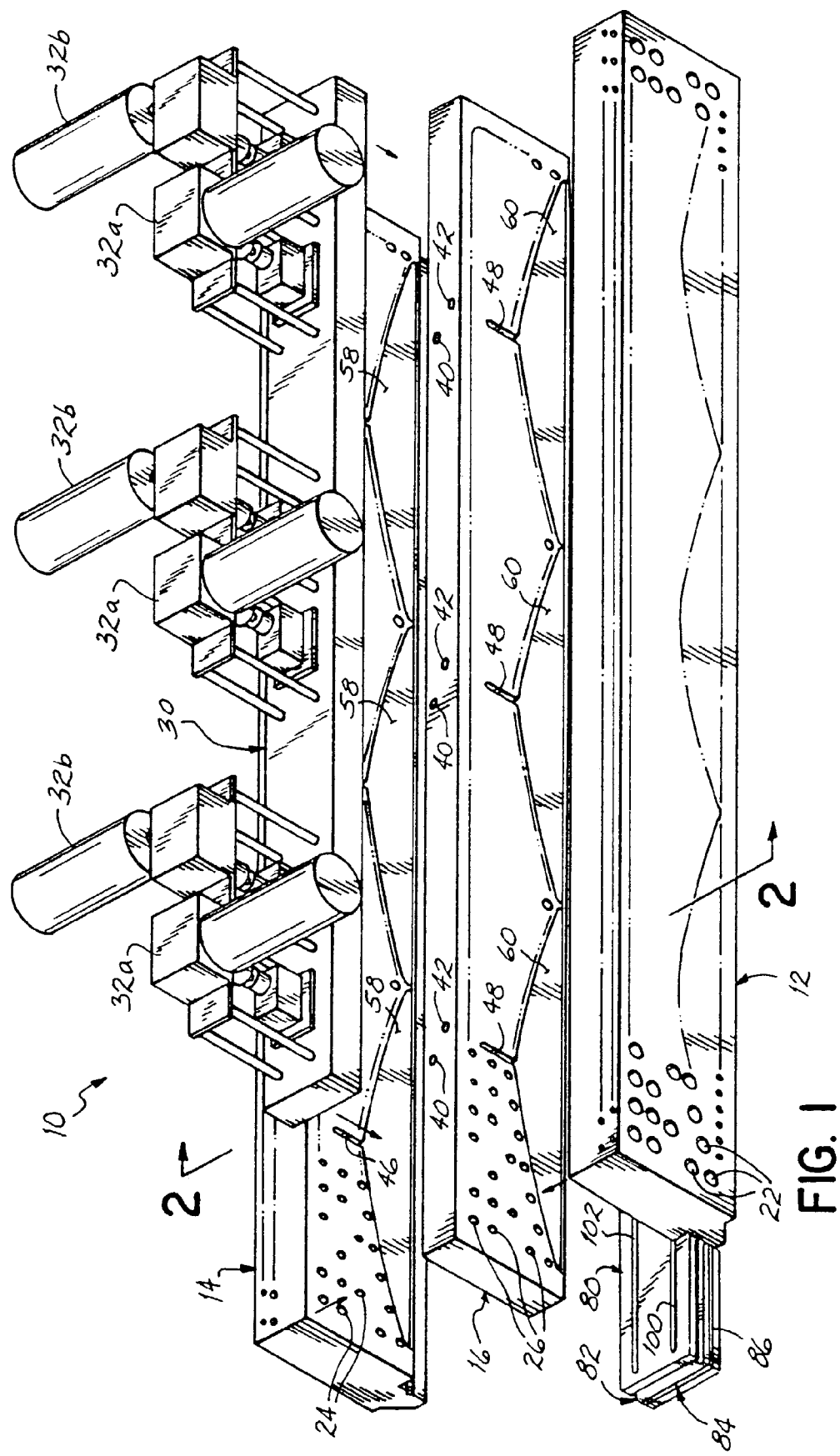
FIG. 1 is an exploded perspective view of a multi-component spunbonding apparatus constructed in accordance with a preferred embodiment of the invention.
Figure 2:
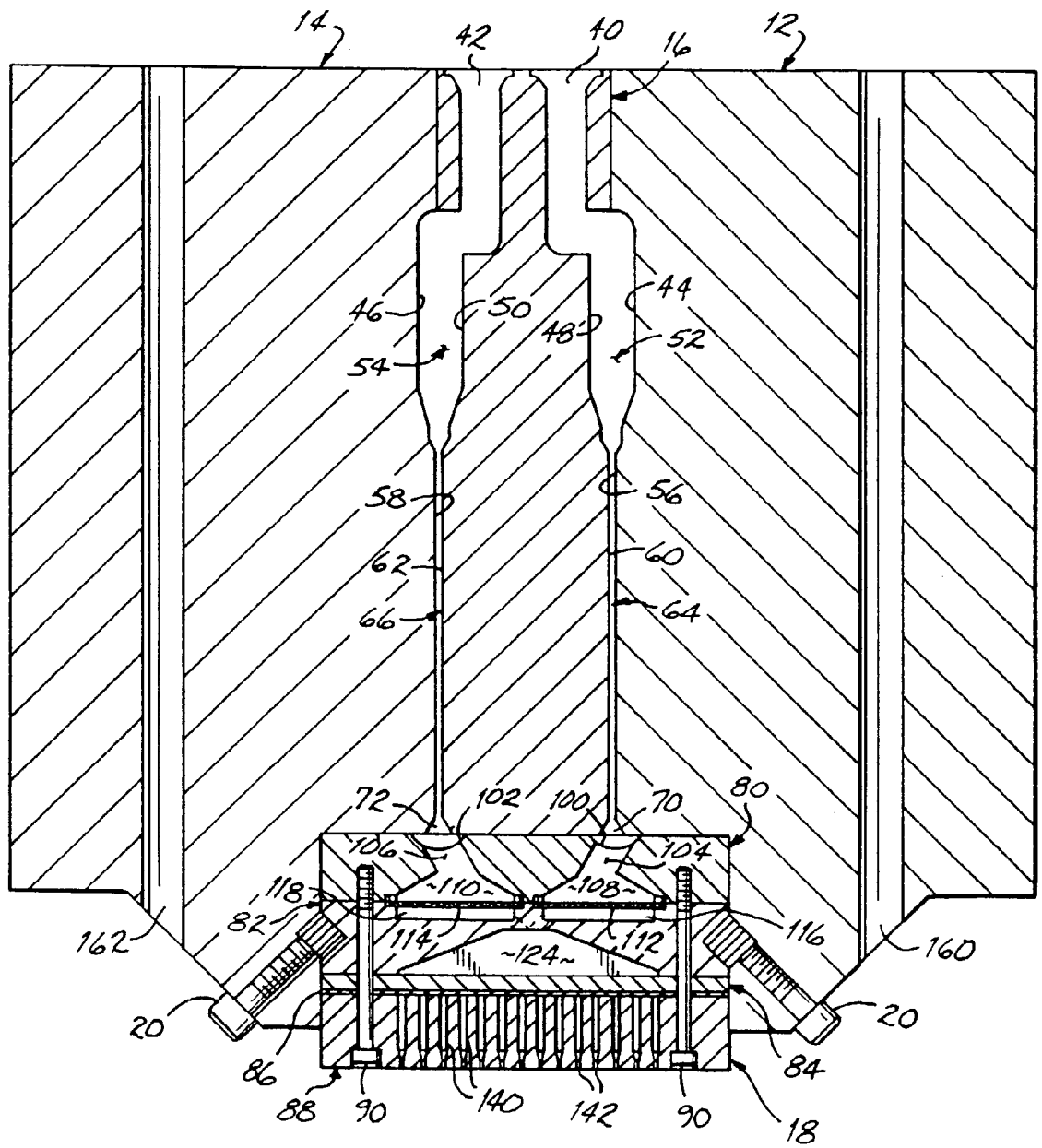
FIG. 2 is a cross section taken along line 2—2 of FIG. 1, but illustrating the manifold elements and die tip in assembled condition.

Referring to FIGS. 1 and 2, a spunbonding apparatus 10 constructed in accordance with the inventive principles includes first and second outer manifold elements 12, 14. An intermediate manifold element 16 is coupled between outer manifold elements 12, 14 in sandwiching relation. A die tip or spin pack assembly 18 is coupled to outer manifold elements 12, 14 and intermediate manifold element 16 by fastener assemblies 20. Threaded fasteners (not shown) are inserted through holes 22, 24 in the respective outer manifold elements 12, 14 and thread into internally threaded holes 26 contained in intermediate manifold element 16. Although only holes 26 are shown, it will be appreciated that the opposite side of manifold element 16 has similar threaded holes. A liquid supply block 30 is mounted to an upper surface of intermediate manifold element 16 and includes a plurality of pumps 32a, 32b for respectively pumping first and second types of liquid, such as thermoplastic material. The first type of liquid is pumped into each inlet 40 and the second type of liquid is pumped into each inlet 42 in the top of intermediate manifold element 16. Although three sets of pumps 32a, 32b are shown in this preferred embodiment, it will be understood that a greater or fewer number of pump sets 32a, 32b may be provided instead. Alternatively, other manners of supplying manifolds 12, 14, 16 with multiple types of liquids may be employed instead. In addition, the side-by-side manifold concepts of this invention may be employed to form filaments from more than two component liquids.

As shown best in FIG. 2, outer manifold elements 12, 14 include respective opposed notches 44,-46 communicating with liquid supply inlets 40, 42. Corresponding notches 48, 50 are formed in opposite side surfaces of intermediate manifold element 16 such that respective channels 52, 54 are formed for receiving the component liquids from inlets 40, 42. Recesses 56, 58 are formed in opposed sides of outer manifold elements 12, 14 and align with corresponding recesses 60, 62 formed on opposite sides of intermediate manifold element 16. These aligned recesses form respective channels 64, 66 which communicate at respective upper ends thereof with channels 52, 54 and which further include discharge outlets 70, 72 at lower ends thereof. It will be appreciated that channels 64, 66 may instead be formed by recesses formed only on intermediate manifold element 16 or only on outer manifold elements 12, 14 and, in that case, the abutting manifold element will serve as a cover plate. As appreciated from FIG. 1, each channel 64, 66 formed respectively between recesses 56, 60 and recesses 58, 62 diverges or widens in a lengthwise direction relative to the lengthwise extents of manifold elements 12, 14, 16 from inlet channels 52, 54 to outlets 70, 72.

Figure 3:
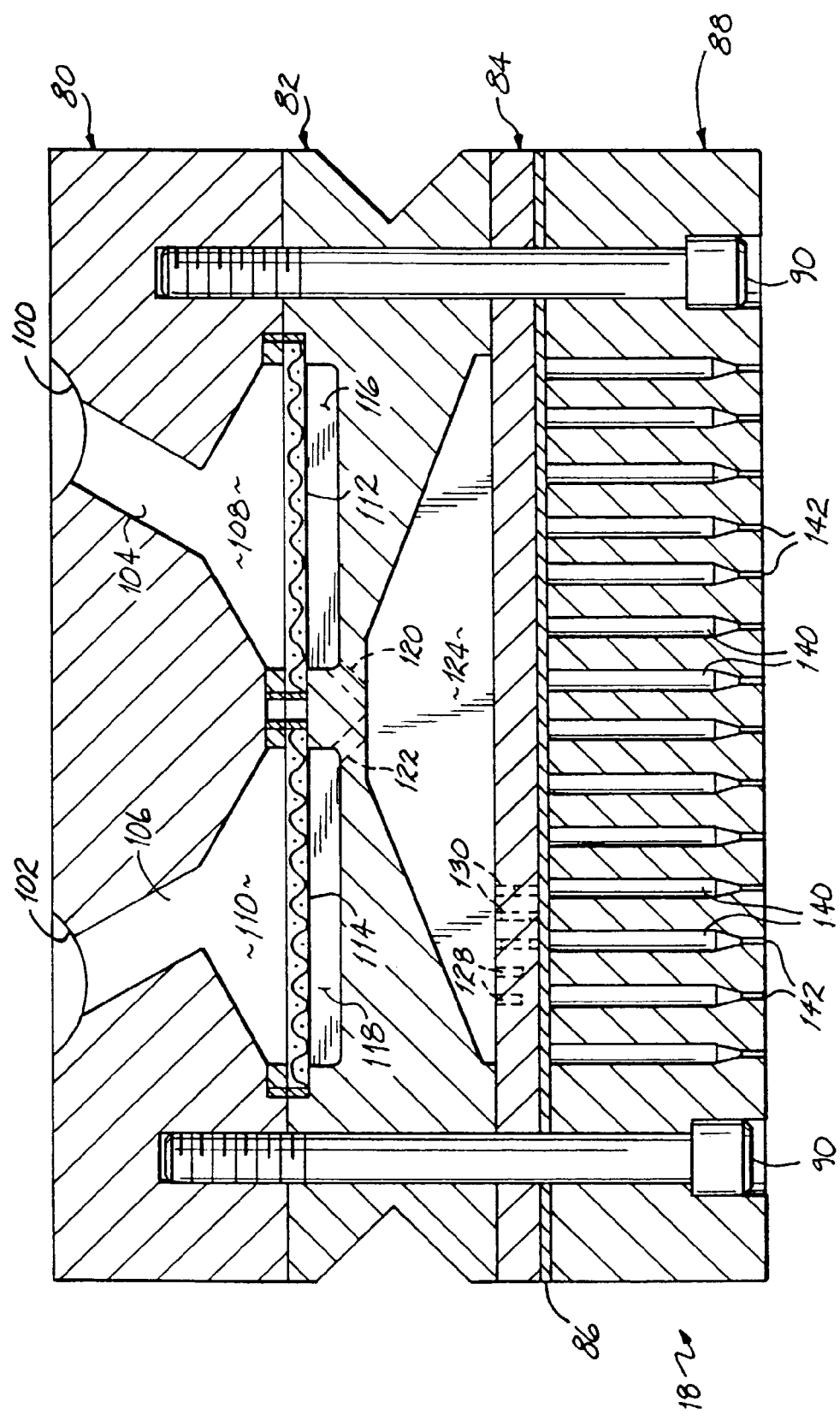
FIG. 3 is an enlarged view of the die tip shown in FIG. 2.

Referring to FIGS. 2 and 3, die tip 18 more specifically comprises a conventional spin pack assembly. The details of assembly 18 are more specifically disclosed in U.S. Pat. No. 5,562,930, the disclosure of which is hereby incorporated by reference in its entirety. Generally, die tip 18 comprises a top plate 80, a screen support plate 82, a metering plate 84, an etched distributor plate 86 and a spinneret plate 88 held together by fasteners 90. The respective first and second liquids enter slots 100, 102 formed on the upper surface of top plate 80 from outlets 70, 72 of channels 64, 66. The first and second liquids then enter a series of passages 104 and a series of passages 106 communicating with respective cavities 108, 110. The two liquids then respectively travel through filters 112, 114 and enter liquid component slots 116, 118. Slot 116 communicates with holes 120 and slot 118 communicates with holes 122. One of several slots 124 is shown in FIGS. 2 and 3 for receiving one of the two component liquids from hole 120 or hole 122. Although not shown in the drawings, another alternating series of slots is provided for the other component liquid. Apertures 128 are provided for the first component liquid and apertures 130 are provided for the second component liquid in metering plate 84.

The etched distributor plate 86 receives the mutually separated component liquids and combines these liquids in the desired manner as the liquids reach the discharge passages 140. The multi-component filaments are then discharged through outlets 142. Holes 160 or 162 located along the length of each outer manifold element 12, 14 receive heater rods for heating the two liquids and the process air to an appropriate application temperature. Temperature sensing devices (not shown), such as RTD's or thermocouples are also placed in manifold elements 12, 14 to control the temperature. A more complete description and operation of the die tip or spin pack 18 may be found in the above incorporated U.S. Pat. No. 5,562,930. In addition, it will be appreciated that many other die tip assemblies may be used for spunbonding applications or other multi-component filaments extrusion applications and that this disclosure is merely illustrative of one preferred configuration.

While the present invention has been illustrated by a description of various preferred embodiments and while these embodiments has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

I claim:

1. A method of extruding first and second liquid materials into multi-component filaments, comprising:

feeding the first liquid material into a first liquid inlet located in an intermediate manifold element;

feeding the second liquid material into a second liquid inlet located in the intermediate manifold element;

passing the first liquid material between a first outer surface of the intermediate manifold element and a first opposed surface of a first outer manifold element;

passing the second liquid material between a second outer surface of the intermediate manifold element and a second opposed surface of a second outer manifold element;

directing the first and second liquid materials, respectively, from passages located between the intermediate manifold and the first and second outer manifolds into first and second elongate slots extending along a lengthwise dimension of a die tip; and discharging multi-component filaments comprised of the first and second liquid materials from the die tip.

2. The method of claim 1, wherein feeding the first and second liquid materials further comprises pumping the first and second liquid materials from first and second pumps respectively coupled to first and second liquid inlets located in the intermediate manifold element.

3. The method of claim 1, wherein passing the first and second liquid materials further comprises:

passing the first liquid material into a recess formed between the first outer surface of the intermediate manifold element and the first opposed surface of the first outer manifold element; and passing the second liquid material into a recess formed between the second outer surface of the intermediate manifold element and the second opposed surface of the second outer manifold element.

4. The method of claim 1, wherein passing the first and second liquid materials further comprises:

passing the first liquid material into a plurality of recesses formed between the first outer surface of the intermediate manifold element and the first opposed surface of the first outer manifold element; and passing the second liquid material into a plurality of recesses formed between the second outer surface of the intermediate manifold element and the second opposed surface of the second outer manifold element.

5. The method of claim 1, further comprising:

collecting said multi-component filaments on a collector.

6. The method of claim 1, further comprising:

laying at least one layer of said multi-component filaments on at least one other layer of multi-component filaments.

* * * * *